US009324493B2

(12) United States Patent
Krainer et al.

(10) Patent No.: US 9,324,493 B2
(45) Date of Patent: Apr. 26, 2016

(54) ACTUATOR FOR A TAP CHANGER

(71) Applicant: ABB Technology Ltd, Zurich (CH)

(72) Inventors: Per Krainer, Ludvika (SE); Harald Hedsten, Grängesberg (SE)

(73) Assignee: ABB TECHNOLOGY LTD, Zurich (CH)

( * ) Notice: Subject to any disclaimer, the term of this patent is extended or adjusted under 35 U.S.C. 154(b) by 0 days.

(21) Appl. No.: 14/431,157

(22) PCT Filed: Sep. 11, 2013

(86) PCT No.: PCT/EP2013/068825
§ 371 (c)(1),
(2) Date: Mar. 25, 2015

(87) PCT Pub. No.: WO2014/048752
PCT Pub. Date: Apr. 3, 2014

(65) Prior Publication Data

US 2015/0235760 A1 Aug. 20, 2015

(30) Foreign Application Priority Data

Sep. 25, 2012 (EP) .................................... 12185957

(51) Int. Cl.
*H01F 21/12* (2006.01)
*H01H 35/38* (2006.01)
(Continued)

(52) U.S. Cl.
CPC ..................................... *H01F 29/04* (2013.01)

(58) Field of Classification Search
CPC ........... H01F 29/04; H01F 7/06; H01F 7/064; H01F 7/18; H01H 47/325; H01H 35/14; H01H 35/142; F16K 11/24; H01K 31/00
USPC ....................... 335/61; 336/150; 123/47, 540; 200/61.45, 34, 61.08, 61.53, 82 R; 251/137, 222, 5, 57
See application file for complete search history.

(56) References Cited

U.S. PATENT DOCUMENTS 3,671,698 A 6/1972 Kramer
3,793,498 A * 2/1974 Matsui ................ H01H 35/142 180/274

(Continued)

FOREIGN PATENT DOCUMENTS

GB 980677 A 1/1965

OTHER PUBLICATIONS

European Search Report Application No. EP 12 18 5957 Completed: Feb. 20, 2013; Mailing Date: Mar. 1, 2013 5 pages.

(Continued)

*Primary Examiner* — Mangtin Lian
(74) *Attorney, Agent, or Firm* — Whitmyer IP Group LLC

(57) ABSTRACT

An actuator for a tap changer of an electrical transformer, including: a piston, being hollow to define a piston space; a cylinder arranged around the piston such that the piston is arranged to be movable axially into and out of the cylinder; a piston ring fixed to the outside surface of the piston such that a cylinder space is formed between the piston and the cylinder and delimited by the piston ring, the cylinder space having a variable volume which is configured to vary with axial movement of the piston; and a spring engaging both the piston and the cylinder such that the spring is able to be compressed and elongated, respectively, with axial movement of the piston. The piston space is connected to the cylinder space via at least one hole through the hollow piston. The piston space is connected to an outside of the piston.

11 Claims, 5 Drawing Sheets

(51) Int. Cl.
*F16K 31/44* (2006.01)
*H01F 29/04* (2006.01)

(56) References Cited

U.S. PATENT DOCUMENTS 4,430,535 A * 2/1984 Berg ..................... H01H 3/605
200/325
6,347,615 B1 * 2/2002 Hopfl ..................... H01H 3/605
123/447

OTHER PUBLICATIONS

International Preliminary Report on Patentability Application No. PCT/EP2013/068825 Issued: Dec. 8, 2014 14 pages.
International Search Report and Written Opinion of the International Searching Authority Application No. PCT/EP2013/068825 Completed: Dec. 4, 2013; Mailing Date: Dec. 16, 2013 8 pages.

* cited by examiner

ACTUATOR FOR A TAP CHANGER

TECHNICAL FIELD

The invention relates to an actuator for a tap changer of an electrical transformer, the actuator comprising a piston and a cylinder, and being actuated by a spring which is loaded by axial movement of the piston relative to the cylinder and induces axial movement of the piston in the opposite direction when the spring is released.

BACKGROUND

A transformer tap is a connection point along a transformer winding that allows a certain number of turns to be selected. This means, a transformer with a variable turns ratio is produced, enabling voltage regulation of the output. The tap selection is made via a tap changer mechanism. The tap changer is a mechanical device which obtains its power from a spring loaded actuator. The spring is loaded (charged) with energy to then be released (discharged) to provide a fast movement of a diverter switch which moves between different contacts, where diverter resistors are used to mitigate the transition state when the switch moves between different contacts when the tap changer is on-load (without halting the operation of the transformer). A diverter is a resistor used to divert part of an electric current, as one connected in shunt with the series winding or with the commutating-pole winding of a machine.

GB 980,677 discloses a mechanism capable of producing repeated rotation of an output shaft in alternate senses between two latching positions as a result of continued rotation of an input shaft, including resilient driving means connected to drive the output shaft, charging means for said resilient driving means and operated by the input shaft, first and second latching means for holding the output shaft in said two latching positions, and means operated by the input shaft for releasing first said latching means when the shaft is in one said latching position and the resilient driving means is charged, the arrangement being such that the resilient driving means then drives the output shaft to the other latching position, where it engages with second said latching means. One embodiment of the document discloses a mechanism for driving an output shaft, which in turn operates the diverter switches of an on-load transformer tap-changer.

U.S. Pat. No. 6,347,615 discloses a tap-changer vacuum switch having an actuating rod which is extending and displaceable along an axis and which is provided with a damper having a damper housing offset from and fixed relative to the vacuum switch, and a rod piston fixed on the valve-actuating rod, in the damper housing. The damper housing is formed with a pair of radially open ports opening into the compartment. An in-only check valve fitted to one of the ports only permits fluid flow into the compartment, and an out-only check valve fitted to the other port only permits fluid flow out of the compartment. The opening and closing pressures for these valves are largely determined by the constants of their springs. Since the spring constant is much less susceptible to change as its temperature changes, this means that the valves will perform uniformly whether hot or cold. The document is concerned with preventing bouncing of a vacuum switch by applying a constant pressure independent of the oil viscosity.

The time it takes the diverter switch to disconnect from a contact and to connect to another contact is important to achieve good operation of the tap changer. However, the velocity of the switch is dependent on the viscosity of transformer oil in which the tap changer operates, which viscosity is dependent on the temperature of the oil which can vary greatly over an operation cycle of the transformer. The velocity, and thus the switching time, is also dependent on the power of the actuator spring and on mechanical friction within the tap changer, parameters which may also vary over time du to general wear of the tap changer.

SUMMARY

It is an objective of the present invention to at least alleviate problems in the prior art related to varying switching speed of a tap changer over time.

According to an aspect of the present invention, there is provided

An actuator (1) for a tap changer (31) of an electrical transformer, the actuator comprising: a movable piston (2) having a longitudinal axis (13); an energy storing device (10), configured for storing energy during axial movement of the piston (2) in a direction and for inducing axial movement of the piston (2) in an opposite direction when the energy stored in the energy storing device (10) is released; wherein a space (9) is defined within the actuator (1), the space having a volume which varies with the axial movements of the piston (2); and at least one choke valve (12) arranged for controlling a flow of a fluid passing through the choke valve between the variable volume space (9) and an outside of the actuator as a result of said axial movement of the piston (2) when the energy stored in the energy storing device (10) is released.

According to another aspect of the present invention, there is provided a use of an embodiment of an actuator of the present invention, for moving a switch of a tap changer in a liquid-filled transformer.

According to another aspect of the present invention, there is provided a method of controlling a velocity of an actuator (1) for a tap changer (31) of an electrical transformer, the actuator being immersed in a liquid and having a central longitudinal axis (13), the method comprising: storing energy in an energy storing device (10) by a first axial movement, in a first direction, of a piston (2) extending along said axis (13), by which axial movement the liquid is forced to flow between a space (9) defined in the actuator and an outside of the actuator (1), the volume of the space (9) being variable with the axial movement of the piston (2); and releasing the energy storing device (10) to induce a second axial movement of the piston (2), by which second axial movement the liquid is pressed through a choke valve (12) as a result of the volume of the space (9) changing with the second axial movement of the piston (2) in a second direction, opposite to the first direction, whereby the axial speed of the second axial movement of the piston is controlled by means of the choke valve.

It is advantageous to, in accordance with the present invention, use a choke valve in the actuator of the tap changer. The choke valve produces a pressure drop in the fluid in which the actuator operates, which pressure drop brakes the discharge movement of the actuator. The use of a choke valve, e.g. a sharp edged throttle, makes the pressure drop essentially independent of the viscosity of the fluid. Thus, by means of the choke valve, the speed of the movement provided by the actuator is made dependent primarily on this pressure drop in relation to the power of the energy storing means, and not on the viscosity of the fluid and/or on the mechanical friction in the tap changer. A stronger energy storing means, e.g. a spring, may be used, whereby the resistance relating to viscosity and friction is negligible in relation to the resistance provided by the choke valve. This implies that the velocity, and thus the switching time, of the tap changer will not change over time due to varying temperature and/or wear of the tap changer. Further, if a more powerful energy storing means is used, as made possible by the choke valve, there is a safety margin in case the mechanics are sluggish for some reason, e.g. due to particles in the fluid getting stuck and hindering the mechanics. Generally, a more powerful energy storing means provides better conditions for performing the switching.

In some embodiments, the variable volume space is a piston space formed within the piston, and the choke valve is arranged in a fluid flow path between the piston space and the outside of the actuator. In this case a hollow piston is used for defining the variable space.

In some embodiments, the actuator further comprises a cylinder arranged around the piston such that the piston is arranged to be movable axially inside the cylinder, the cylinder comprising a fixed annular sealing portion extending in a plane transverse to the longitudinal axis and sealingly abutting to and around an outside surface of the piston; and a piston ring fixed to the outside surface of the piston and extending around the piston in a plane transverse to the longitudinal axis, the piston ring forming a seal between the outside surface of the piston and an inside surface of the cylinder such that a cylinder space is formed between the piston and the cylinder and delimited by the piston ring and the sealing portion of the cylinder; wherein the variable volume space is the cylinder space having a variable volume which is configured to vary with axial movement of the piston in relation to the cylinder; and wherein the choke valve is arranged in a fluid flow path between the cylinder space and the outside of the actuator.

In some embodiments, the choke valve is arranged in the annular sealing portion or in the piston ring.

In some embodiments, the piston is hollow to define a piston space having an invariable volume. In this case, the piston space is connected to the cylinder space via at least one hole through the hollow piston, between the piston space and the cylinder space. Further, the piston space is connected to the outside of the actuator via the choke valve.

In some embodiments, the actuator is configured to operate in liquid, whereby the invariable piston space as well as the variable cylinder space are liquid-filled. Examples of environments where the actuator may conveniently be used include liquid fluid, e.g. oil, filled transformers or the like.

In some embodiments, the actuator is arranged to move a diverter switch in a liquid-filled transformer. Such a switch in the tap changer is particularly dependent on a uniform controlled velocity and switching time. In some embodiments, a switch (e.g. a diverter switch) actuated by the actuator, in a first position, connects an electrical line to a first tap circuitry, and, in a second position, connects the electrical line to a second tap circuitry. Thus, the actuator is used for a switch arranged to switch between two different circuitries, e.g. taps, and not e.g. between an open and a closed position of a circuit breaker.

In some embodiments, the piston ring is made of a metallic material. The metallic material may be harder than the material of the inside surface of the cylinder. A metallic material, in contrast to a softer material such as a plastic material, may be advantageous since the ring may shear down any unevenness in the inside surface of the cylinder, thus improving the sealing properties of the piston ring against the inside surface of the cylinder, and also reducing the friction in the actuator and preventing the actuator velocity from being dependent on this friction.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

The energy storing device discussed herein may be any such means able to store energy and then release it to induce an axial movement of the piston of the actuator. Examples of an energy storing device include any type of spring such as a spring of a flexible material e.g. a metal, a gas pressure spring, a hydraulic spring, a magnetic spring etc., or a combination thereof.

The term "spring" used herein should be interpreted broadly relating to any elastic object used to store mechanical energy. The spring may e.g. be a tension/extension spring, configured to operate with a tension load, so the spring stretches as the load is applied to it; a compression spring, configured to operate with a compression load, so the spring gets shorter as the load is applied to it, a torsion spring, configured to take a load where the load is not an axial force but a torque or twisting force, and the end of the spring rotates through an angle as the load is applied. The spring may be a constant spring where the supported load will remain the same throughout deflection cycle; or a variable spring where the resistance of the spring to load varies. The spring may e.g. be a coil spring or a flat spring.

The choke valve may be any type of choke valve, e.g. a sharp edged throttle as described as an example herein.

That the piston space is connected to the cylinder space and the outside of the actuator implies that the piston space is in fluid communication both with the cylinder space and with the outside (surroundings) of the actuator, such that the ambient fluid, e.g. oil, can be pressed into and out of, respectively, the cylinder space via the piston space and the throttle when the piston moves into and out of the cylinder. That the piston moves out of the cylinder means that the piston moves in a direction such that it extends further and further out of the cylinder, but without actually being removed completely from the cylinder.

Figure 1:
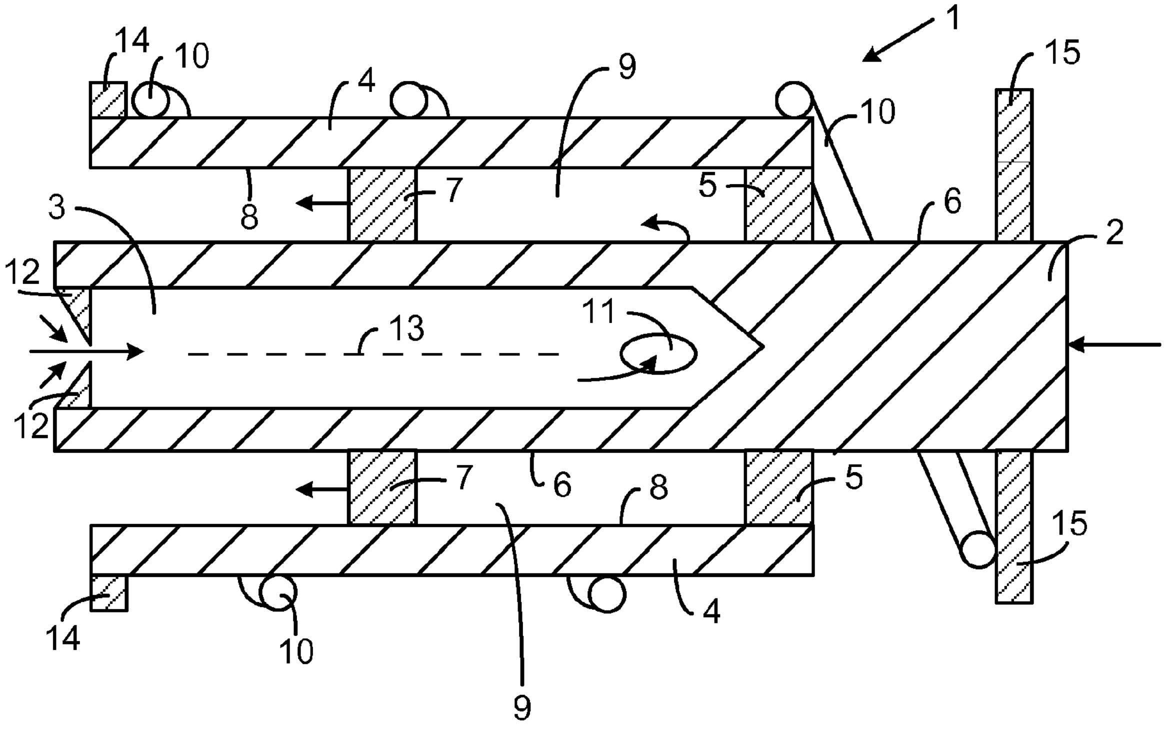
FIG. 1 is a schematic view in longitudinal section of an embodiment of the actuator of the present invention, illustrating a spring being loaded.

FIG. 1 is a schematic illustration in longitudinal section of an embodiment of the actuator 1 of the present invention. A piston 2 is arranged extending into a cylinder 4. The piston has a central longitudinal axis 13 and at least the part of the piston configured to extend into the cylinder 4 may have an essentially circular cross section. The cylinder, at least the part configured for receiving the piston 2, may correspondingly have an essentially circular cross section. An energy storing device to in the form of a coil spring is arranged around, on the outside of, the cylinder 4. The spring to engages (or is in mesh with) the cylinder by means of the cylinder flange 14 against which an end of the spring rests, and engages (or is in mesh with) the piston by means of the piston flange 15 against which an opposite end of the spring rests. Thus, the spring to is compressed (being loaded/charged) when the piston 2 moves into the cylinder 4, as indicated by the arrow furthest to the right in the figure, and extended (released/discharged) when the piston moves out of the cylinder, i.e. moves to the right in the figure. A compression coil spring is only one of many alternatives of springs that can be used. Also, in some embodiments, the spring may be loaded when extended, and compress when released.

A piston ring 7 is fixed to the outside of piston 2 to form a seal between the piston and the cylinder, while maintaining a concentric annular space between the piston 2 and the cylinder 4. The cylinder 4 comprises a fixed annular sealing portion 5 extending in a plane transverse to the longitudinal axis 13 and sealingly abutting to and around an outside surface 6 of the piston 2. The sealing portion 5 of this exemplary embodiment marks the end of the cylinder 4, through which an outer end of the piston 2 extends, the inner end of the piston extending into the cylinder. In the annular space between the piston and the cylinder, a cylinder space 9 is formed between the sealing portion 5 and the piston ring 7 between the outer surface 6 of the piston and the inner surface 8 of the cylinder. This cylinder space 9 has a variable volume since the piston ring 7 moves with the piston, as indicated by arrows in the figure, increasing the volume of the cylinder space 9 when the piston is pushed into the cylinder, and reducing said space 9 when the piston is pushed out of the cylinder.

The piston 2 is hollow, defining a piston space or cavity 3 inside the piston. The piston space 3 may be concentric in relation to the piston and the cylinder, and be rotation symmetrical around the central longitudinal axis 13 of the piston. The piston space 3 is in fluid communication with the cylinder space 9 via a through hole 11 between the two spaces or cavities, such that a fluid can flow between said two cavities 3 and 9 via the hole 11. The piston space 3 is also in fluid communication with the ambient fluid outside of the actuator 1, via a choke valve 12 in the form of a sharp-edged throttle. The throttle 12 may be positioned at an end of the piston 2. The throttle allows ambient fluid (as indicated by the arrows) to flow into the piston space 3, and further into the cylinder space 9, via the throttle 12 and the hole 11, when the piston is pushed to the leftwards in the figure. The throttle 12 can have an essentially triangular cross section. The throttle 12 can be rotation symmetrical around an axis, e.g. the central longitudinal axis of the piston. A central angle at the opening of the throttle and formed by the throttle material, forms a sharp edge in order to reduce the influence of viscosity. For example, if a cross section of the throttle 12 is triangular, the central angle of the triangle forms the sharp edge and may be an acute angle of less than 45°, less than 30°, less than 20° or less than 10°.

Figure 2:
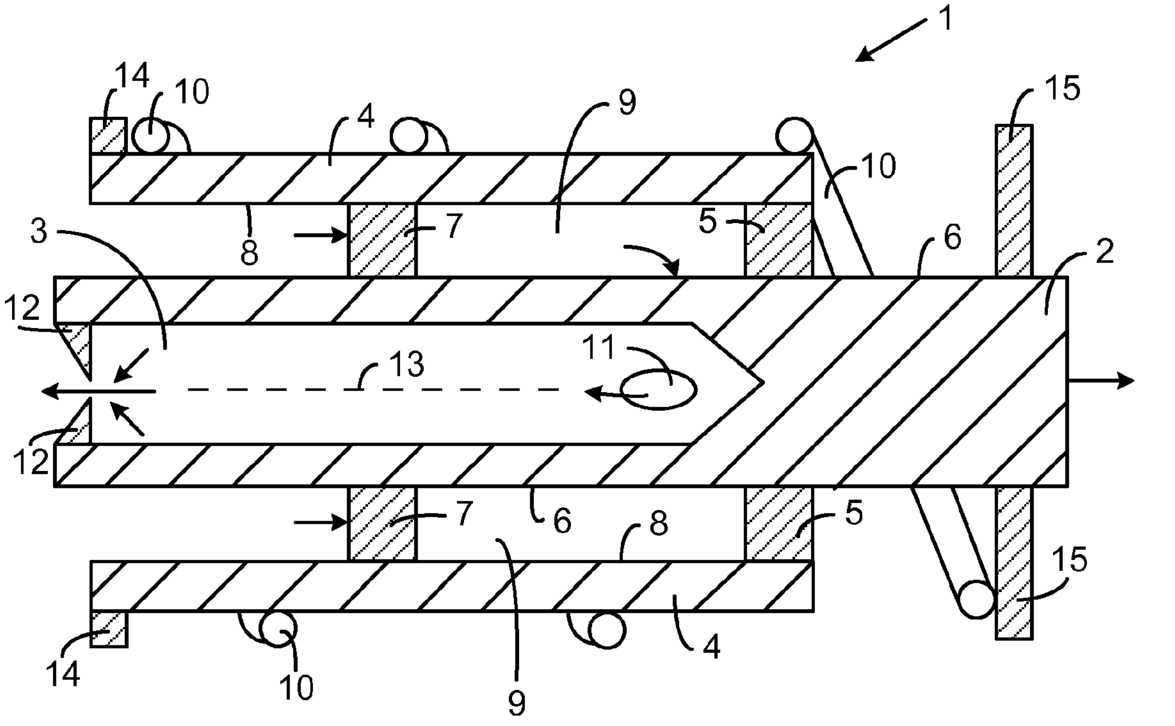
FIG. 2 is a schematic view in longitudinal section of the embodiment of FIG. 1 of the actuator of the present invention, illustrating the spring being released.

FIG. 2 is a schematic illustration in longitudinal section of the same embodiment of the actuator 1 of the present invention as in FIG. 1. However, in FIG. 2, the arrows illustrates how the piston is pushed rightwards in the figure as the spring 10 is released. As also illustrated by arrows, fluid is then pressed out from the cylinder space 9 into the piston space 3 via the hole 11 and into the surroundings from the piston space 3 via the throttle 12.

Figure 3:
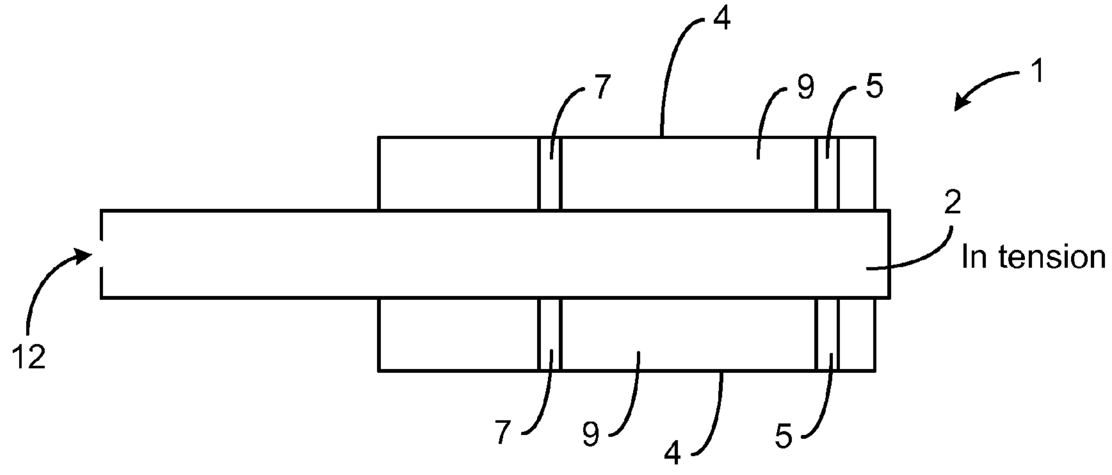
FIG. 3 is a schematic view in longitudinal section of another embodiment of the actuator of the present invention, illustrated when the energy storing device is loaded/in tension.
Figure 4:
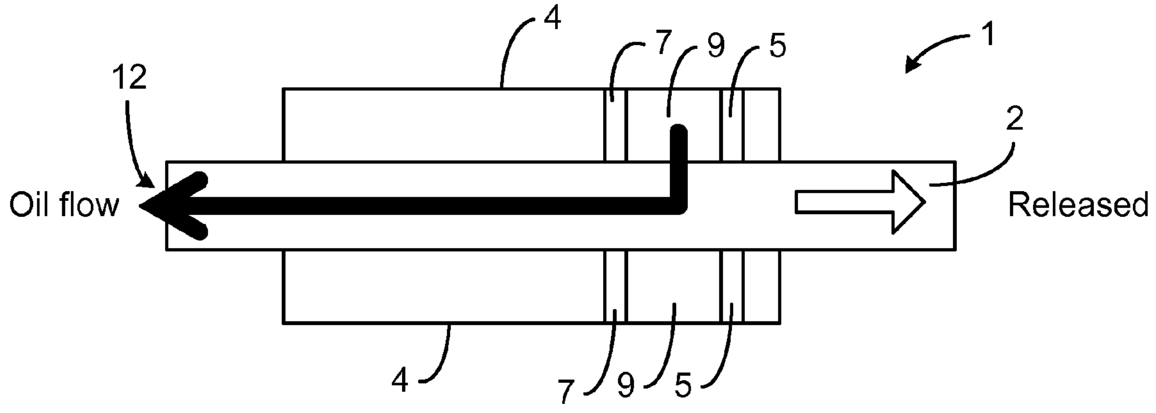
FIG. 4 is a schematic view in longitudinal section of the embodiment of the actuator of FIG. 3 of the present invention, illustrating when the stored energy of the energy storing device is released.

FIGS. 3 and 4 schematically illustrates an embodiment of the actuator 1 of the present invention, in longitudinal section (cf. FIGS. 1 and 2). The embodiment is more general, and the figures more schematic, but includes the more detailed embodiment of FIGS. 1 and 2. For the sake of clarity, the energy storing device 10 is not shown. FIG. 3 illustrates the situation when the energy storing device is loaded and the actuator thus is in tension. The variable space 9 is defined between the hollow piston 2, the cylinder 4, the annular sealing portion 5 and the piston ring 7. The choke valve 12 is, as in FIGS. 1 and 2, positioned at an end of the piston 2, allowing a non-variable space formed in the hollow piston to communicate with the outside of the piston and actuator 1. FIG. 4 illustrates what happens when the energy storing device is released and the piston 2 and the piston ring 7 thus move axially as indicated by the big arrow at the right end of the piston 2. The variable space 9 is reduced with the axial movement whereby the fluid therein, e.g. oil, is pressed from the variable space 9 into the hollow piston 2 and out through the choke valve 12, as illustrated by the solid arrow. As discussed above, the choke valve controls the fluid flow thereby braking the axial movement of the piston 2, making the velocity of the axial movement independent of the viscosity of the fluid and, to some extent, of the force exerted by the energy storing device.

Figure 5:
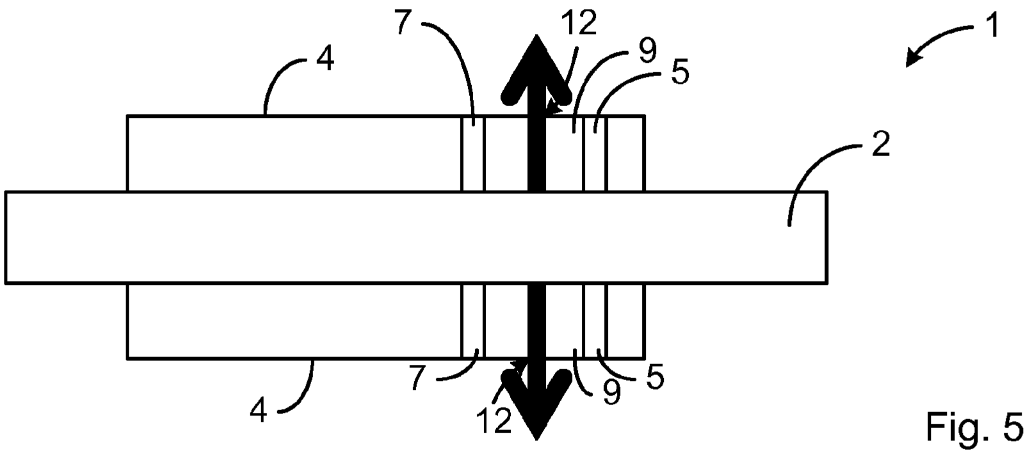
FIG. 5 is a schematic view in longitudinal section of another embodiment of the actuator of the present invention.

FIG. 5 schematically illustrates another embodiment of the actuator 1 of the present invention, in longitudinal section. For the sake of clarity, the energy storing device to is not shown. As in FIGS. 3 and 4, the variable space 9 is defined between the hollow piston 2, the cylinder 4, the annular sealing portion 5 and the piston ring 7. A choke valve 12 is in this embodiment positioned through the cylinder 4 in the variable space 9, allowing the variable space 9 to communicate with the outside of the cylinder 4 and actuator 1, as illustrated by the solid arrows. A plurality of radially positioned choke valves 12 can be used (two are shown in FIG. 5), providing redundancy if a choke valve 12 is blocked or such. In this embodiment, the fluid does not have to flow via a space formed in the piston 2, why a solid piston may be used. Also, no hole 11 between the variable space 9 and a space formed in the piston 2 is needed, making the embodiment of FIG. 5 less complex than the embodiments of FIGS. 1-4.

Figure 6:
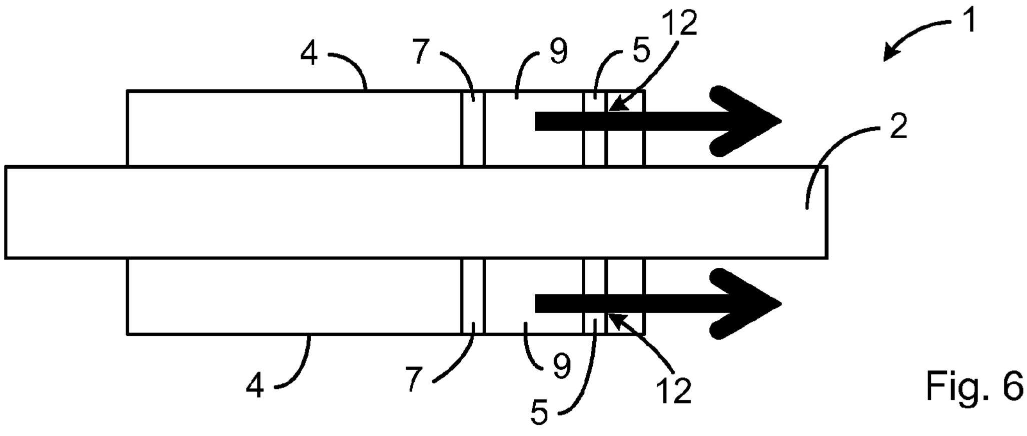
FIG. 6 is a schematic view in longitudinal section of another embodiment of the actuator of the present invention.

FIG. 6 schematically illustrates another embodiment of the actuator 1 of the present invention, in longitudinal section. For the sake of clarity, the energy storing device to is not shown. As in FIGS. 3 to 5, the variable space 9 is defined between the hollow piston 2, the cylinder 4, the annular sealing portion 5 and the piston ring 7. A choke valve 12 is in this embodiment positioned through the annular sealing portion 5 in the variable space 9, allowing the variable space 9 to communicate with the outside of the cylinder 4 and actuator 1, as illustrated by the solid arrows. A plurality of radially positioned choke valves 12 can be used (two are shown in FIG. 6), providing redundancy if a choke valve 12 is blocked or such. Again, in this embodiment, the fluid does not have to flow via a space formed in the piston 2, why a solid piston may be used. Also, no hole 11 between the variable space 9 and a space formed in the piston 2 is needed, making the embodiment of FIG. 5 less complex than the embodiments of FIGS. 1-4.

Figure 7:
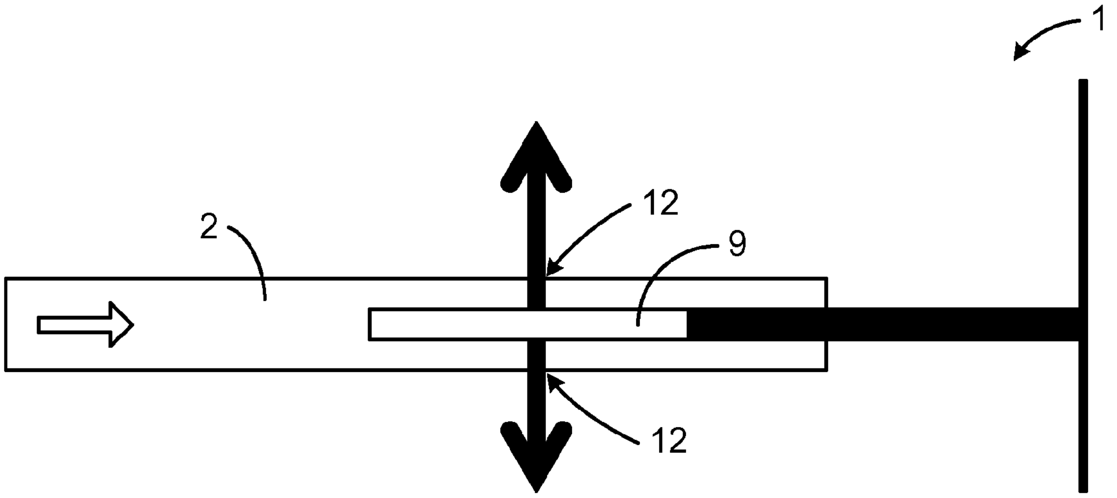
FIG. 7 is a schematic view in longitudinal section of another embodiment of the actuator of the present invention.

FIG. 7 schematically illustrates another embodiment of the actuator 1 of the present invention, in longitudinal section. For the sake of clarity, the energy storing device 10 is not shown. In contrast to the embodiments of FIGS. 1-6, in the embodiment of FIG. 7, the variable space 9 is formed in a hollow piston 2. The volume of the variable space 9 is varied by a rod inserted into the variable space 9, reducing said space 9 when said rod is pressed further into the variable space. A choke valve 12 is in this embodiment positioned through a wall of the variable space 9 in the piston 2, e.g. radially, allowing the variable space 9 to communicate with the outside of the piston 2 and actuator 1, as illustrated by the solid arrows. A plurality of radially positioned choke valves 12 can be used (two are shown in FIG. 7), providing redundancy if a choke valve 12 is blocked or such. When the piston 2 moves axially (in the figure indicated by an arrow at the left end of the piston and pointing to the right, indicating that the piston is moving to the right in the figure), the rod, e.g. a stationary rod, is pressed further into the variable space, forcing the fluid therein to exit the variable space via the choke valves 12.

In the embodiments of FIGS. 1-7, the fluid is pressed through the choke valve as the energy storing device is released when the variable space 9 is reduced. However, it is also contemplated that the variable space 9 may be increased when the energy storing device is released, and that thus fluid is sucked into the variable space 9 via the choke valve 12. It may however be more convenient to press the fluid though the choke valve rather than sucking it past said choke valve, why it is currently preferred that the fluid is pressed through the choke valve as the energy storing device is released when the variable space 9 is reduced. There is e.g. a risk of cavitation with suction instead of pressing.

Figure 8:
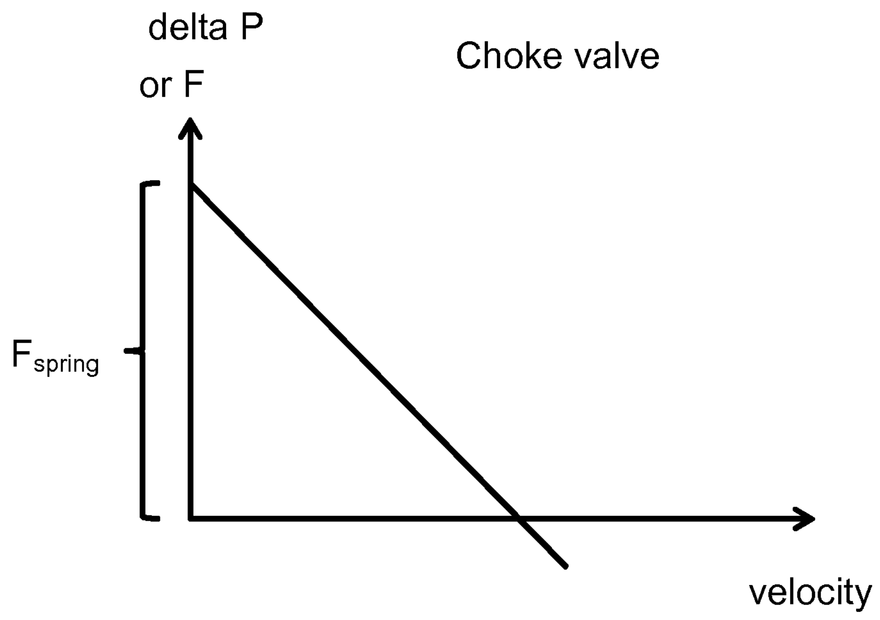
FIG. 8 is a graph illustrating the relationship between the force exerted by the energy storing device and the velocity of the piston of the actuator.

FIG. 8 is a graph illustrating the relationship between the force exerted by the energy storing device and the velocity of the piston of the actuator. The area of the choke valve 12 opening is proportional to the slop of the curve and the force of the energy storing device is related to the intersection of the curve with the Y-axis.

Figure 9:
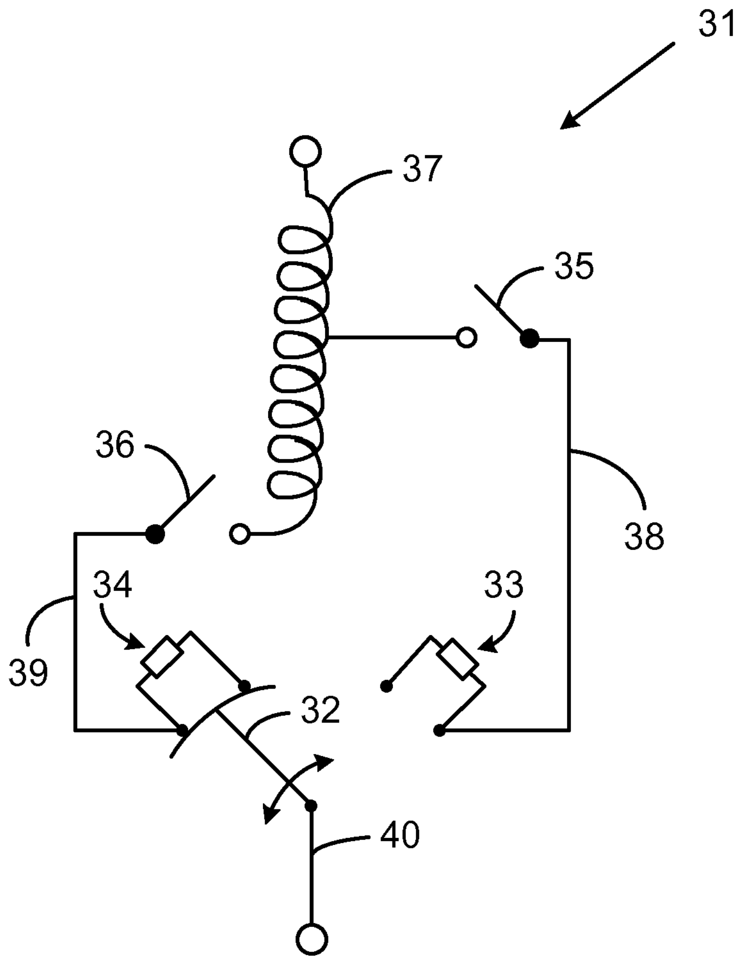
FIG. 9 is a schematic circuit diagram of an embodiment of a tap changer of the present invention.

FIG. 9 schematically illustrates an embodiment of a tap changer 31 in which an actuator 1 of the present invention can be used. A winding 37 of an electrical transformer is shown. The voltage of the current provided by the winding 37 can be controlled by switching between different taps connected to the winding, whereby a different number of turns of the winding can be utilized. A first circuitry 38 is connected to a first contact 33 and can connect to a first tap via a first on/off switch 35. A second circuitry 39 is connected to a second contact 34 and can connect to a second tap via a second on/off switch 36. Each of the contacts 33 and 34 comprises a diverter resistor. A diverter switch 32 connects an electrical line 40 to either the first contact 33 or the second contact 34, and switches between the contacts by means of a rotating movement as indicated by the double-headed arrow in FIG. 3. This rotating switching between the two contacts can be performed wile the transformer is operation and the tap switch 31 is on-load. Thus, it is advantageous that the switching time is low (the velocity of the switch is high) and constant over time. The diverter resistors of the contacts 33 and 34 are used to handle the current from the transformer when the switch is in a position between the two contacts and moves there between. The diverter switch 32 is actuated by an embodiment of the actuator 1 of the present invention, i.e. the movement of the piston when the spring is released induces the rotating movement of the diverter switch 32.

A switching cycle may be as follows:

1. Tap switch 36 is closed and the diverter switch 32 is in contact with contact 33, connecting the line 40 with the winding 37 via the tap switch 35.
2. Tap switch 36 closes while off-load.
3. The diverter switch 32 rotates left in the figure, breaking one connection with the contact 33 and supplying load current through the diverter resistor of contact 33.
4. The diverter switch 32 continues to turn, connecting to both contacts 33 and 34 via their respective resistors. Load is now supplied via the diverter resistors.
5. The diverter switch 32 continues to turn, breaking also the second connection with contact 33. Load is now supplied only via the resistor of contact 34, winding turns no longer bridged.
6. The diverter switch 32 continues to turn, shorting contact 34, connecting to both sides of the resistor. Load is now supplied directly via circuitry 39 and contact 34. Contact 33 is unused.
7. Tap switch 35 opens while off-load.

Example

Piston Ring Material

It is important that the piston ring 7 of a tap changer actuator 1 is durable and does not leak, regardless of whether a throttle 12 is used or not. If the ring 7 breaks or is otherwise worn down, the function of the actuator will be inhibited. Often a soft material, e.g. a rubber or other plastic material, is used for the ring 7. There is then a risk of ageing of the material, and the material may also be sensitive to unevenness of the inner cylinder surface 8 as well as to dirt and particles in the fluid. There is thus a large maintenance requirement.

The inventors have realised that a metallic piston ring may instead be used in a tap changer actuator (with or without a sharp-edged throttle). The metallic ring will not age like a soft material. Preferably, the material of the metallic ring 7 is harder than the material of the inside cylinder surface 8 such that it can make this surface 8 even and reduce friction. The material of the ring may e.g. have a hardness of at least 600 Hv. Further, a metallic piston ring 7 does not affect the sealing ability depending on temperature, and there may even be improved sealing after the hard ring having reduced unevenness of the opposing surface 8. The metallic ring is also less affected by particles and dirt. A metallic ring 7 reduces the need for maintenance of the tap changer.

According to an embodiment of the present invention, there is provided an actuator 1 for a tap changer of an electrical transformer, the actuator comprising: a piston 2, said piston being hollow to define a piston space 3; a cylinder 4 arranged around the piston such that the piston is arranged to be movable axially into and out of the cylinder; a piston ring 7 fixed to the outside surface of the piston such that a cylinder space 9 is formed between the piston and the cylinder and delimited by the piston ring, the cylinder space having a variable volume which is configured to vary with axial movement of the piston; and a spring 10 engaging both the piston and the cylinder such that the spring is able to be compressed and elongated, respectively, with axial movement of the piston; wherein the piston space is connected to the cylinder space via at least one hole 11 through the hollow piston; and wherein the piston space is connected to an outside of the piston via a sharp edged throttle 12.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A tap changer for an electrical transformer, comprising a liquid-filled actuator, the actuator comprising:

a movable piston having a longitudinal axis;

an energy storing device, in mesh with the piston and being configured for storing energy during axial movement of the piston in a direction and for inducing axial movement of the piston in an opposite direction when the energy stored in the energy storing device is released;

wherein a space is defined within the actuator, the space having a volume which varies with the axial movements of the piston; and at least one choke valve arranged for controlling a flow of the liquid, with which the actuator is filled, passing through the choke valve between the variable volume space and an outside of the actuator as a result of said axial movement of the piston when the energy stored in the energy storing device is released.

2. The tap changer of claim 1, wherein the variable volume space is a piston space formed within the piston, and wherein the choke valve is arranged in a fluid flow path between the piston space and the outside of the actuator.

3. The tap changer of claim 1, wherein the actuator further comprises:

a cylinder arranged around the piston such that the piston is arranged to be movable axially inside the cylinder, the cylinder comprising a fixed annular sealing portion extending in a plane transverse to the longitudinal axis and sealingly abutting to and around an outside surface of the piston; and a piston ring fixed to the outside surface of the piston and extending around the piston in a plane transverse to the longitudinal axis, the piston ring forming a seal between the outside surface of the piston and an inside surface of the cylinder such that a cylinder space is formed between the piston and the cylinder and delimited by the piston ring and the sealing portion of the cylinder;

wherein the variable volume space is the cylinder space having a variable volume which is configured to vary with axial movement of the piston in relation to the cylinder;

wherein the choke valve is arranged in a fluid flow path between the cylinder space and the outside of the actuator; and wherein the energy storing device, is in mesh also with the cylinder.

4. The tap changer of claim 3, wherein the choke valve is arranged in the annular sealing portion or in the piston ring.

5. The tap changer of claim 3, wherein:

the piston is hollow to define a piston space having an invariable volume;

the piston space is connected to the cylinder space via at least one hole through the hollow piston, between the piston space and the cylinder space; and wherein the piston space is connected to the outside of the actuator via the choke valve.

6. The tap changer of claim 1, wherein the actuator is configured to operate in liquid, whereby the variable volume space is liquid-filled.

7. The tap changer of claim 1, wherein the actuator is arranged to move a diverter switch in a liquid-filled transformer.

8. The tap changer of claim 3, wherein the piston ring is made of a metallic material.

9. The tap changer of claim 8, wherein the metallic material is harder than the material of the inside surface of the cylinder.

10. Use of a tap changer for moving a switch in a liquid-filled transformer, the tap changer comprising a liquid-filled actuator, the actuator comprising:

a movable piston having a longitudinal axis;

an energy storing device, in mesh with the piston and being configured for storing energy during an axial movement of the piston in a direction and for inducing axial movement of the piston in an opposite direction when the energy stored in the energy storing device is released;

wherein a space is defined within the actuator, the space having a volume which varies with the axial movements of the piston; and at least one choke valve arranged for controlling a flow of the liquid, with which the actuator is filled, passing through the choke valve between the variable volume space and an outside of the actuator as a result of said axial movement of the piston when the energy stored in the energy storing device is released.

11. The use of a tap changer of claim 10, wherein the switch, in a first position, connects an electrical line to a first tap circuitry, and, in a second position, connects the electrical line to a second tap circuitry.

* * * * *